United States Patent [19]

Henderson, Jr. et al.

[11] 4,453,566
[45] Jun. 12, 1984

[54] HYDRAULIC SUBSEA CONTROL SYSTEM WITH DISCONNECT

[75] Inventors: Herman O. Henderson, Jr.; Joseph L. LeMoine, both of Houston; Jerry B. Tomlin, Sugar Land, all of Tex.

[73] Assignee: Koomey, Inc., Brookshire, Tex.

[21] Appl. No.: 373,184

[22] Filed: Apr. 29, 1982

[51] Int. Cl.³ .................. F16L 37/28; F16L 35/00
[52] U.S. Cl. .................. 137/614.02; 137/236 S; 91/536; 285/18; 285/137 A
[58] Field of Search .......... 285/18, 137 A; 91/536; 137/614.02, 236 S

[56] References Cited

U.S. PATENT DOCUMENTS

| | | | |
|---|---|---|---|
| 3,298,699 | 1/1967 | Hall, Sr. | 285/137 A |
| 3,460,614 | 8/1969 | Burgess | 137/596.18 |
| 3,701,549 | 10/1972 | Koomey et al. | 285/24 |

FOREIGN PATENT DOCUMENTS 183291 9/1955 Austria .................. 91/536

OTHER PUBLICATIONS

Composite Catalog of Oil Field Equipment and Services, vol. 4, p. 6147, 1978-1979.

*Primary Examiner*—A. Michael Chambers
*Attorney, Agent, or Firm*—Fulbright & Jaworski

[57] ABSTRACT

In a hydraulic subsea control system having two separate redundant subsea control pods in which each pod is supplied with a hydraulic power supply line and a plurality of fluid control lines by surface controls. The improvement in means for alternately connecting and disconnecting the fluid control lines to each pod. Coacting quick disconnect couplings having first and second portions are positioned between the surface controls and each of the sets of fluid control lines to each pod. Each coupling portion includes a valve whereby when the first and second portions are engaged the valves permit fluid flow and when they are disengaged shut off fluid flow. First and second junction plates are connected between the surface controls and the connected fluid control lines and a hydraulic cylinder and piston assembly is connected between the first and second plates for alternately connecting and disconnecting the couplings to each pod whereby the two pods are controlled separately, but redundantly. The control of the cylinder and piston assemblies is preferably provided by the hydraulic valve which alternately provides fluid power to the power supply line whereby when power is supplied to the power line of one pod the coacting couplings to that pod are connected while fluid power is disconnected from the other pod, and the coacting couplings to the other pod are disconnected.

6 Claims, 4 Drawing Figures

4,453,566

HYDRAULIC SUBSEA CONTROL SYSTEM WITH DISCONNECT

BACKGROUND OF THE INVENTION

In a conventional hydraulic subsea control system, there are two separate subsea control pods mounted underwater which are controlled by surface controls for controlling underwater equipment. Each pod has connected thereto a fluid supply line for operating underwater equipment and a set of a plurality of fluid control lines actuating subsea control valves for controlling the underwater equipment. The control lines to both pods are simultaneously pressurized, but only the power supply line to one pod is energized at a time for operating the underwater equipment. The problem is that if there is a failure in a control line of one pod, the failure will vent pressure off of the corresponding control line in the second pod. Therefore, a failure in one pod would prevent operation of the corresponding function in the second pod. Such a failure will effectively negate redundancy of control of the failed function.

SUMMARY

The present invention is directed to an improvement in a hydraulic subsea control system having two separate redundant subsea control pods with a hose connected to each pod. Each hose includes a fluid power supply line and a set of fluid control lines. The hoses extend between surface controls and each pod for selectively actuating the control lines for controlling hydraulic power from the power supply line to underwater equipment. A hydraulic valve alternately provides fluid power to the power supply lines of the two pods. The improvement is directed to providing means for alternately connecting and disconnecting the sets of fluid control lines to each pod from the surface controls for providing a separate, but redundant control for operating the underwater equipment.

A further object of the present invention is the provision of coacting quick disconnect couplings having first and second portions and positioned between the surface controls and each set of fluid control lines to the separate pods. Each portion includes a valve, such as a poppet valve whereby when the first and second portions are engaged the valves open to permit fluid flow and when disengaged the valves close to shut off fluid flow through the control lines. First and second junction plates are connected between the surface controls and each set of fluid control lines to the separate pods. The first plates are separately connected to the coupling portion on each set of fluid control lines, and the second plates are connected to the coupling portions connected to the surface controls. A hydraulic cylinder and piston assembly is connected between each of the first and second plates. The assemblies are connected to control means alternately connecting and disconnecting the set of fluid control lines to each pod to the surface controls whereby the two pods are controlled separately but redundantly.

Still a further object of the present invention is whereby the hydraulic cylinder and piston assemblies are double acting and the control means is the hydraulic valve for alternately providing fluid power to the power supply lines whereby when power is supplied to the power lines of one pod the coacting couplings to the one pod are connected while fluid power is turned off and the coacting couplings of the other pod are disconnected.

A still further object of the present invention is the provision of a telescoping joint connected between each of the first and second plates for conducting the power fluid supply to each of the pods.

Another object is the provision of connecting the coupling portions of the plates by a lost motion connection.

A further object is the provision of adjustable stops for controlling the extent of movement of the plates both toward and away from each other for controlling the connection and disconnection of the coupling.

Other and further objects, features and advantages will be apparent from the following description of a presently preferred embodiment of the invention, given for the purpose of disclosure and taken in conjunction with the accompanying drawings.

DESCRIPTION OF THE PREFERRED EMBODIMENT

While the present invention will be described in connection with its use in a hydraulic subsea blowout preventer control system, the present invention is useful in other types of subsea control systems for controlling underwater equipment.

Figure 1:
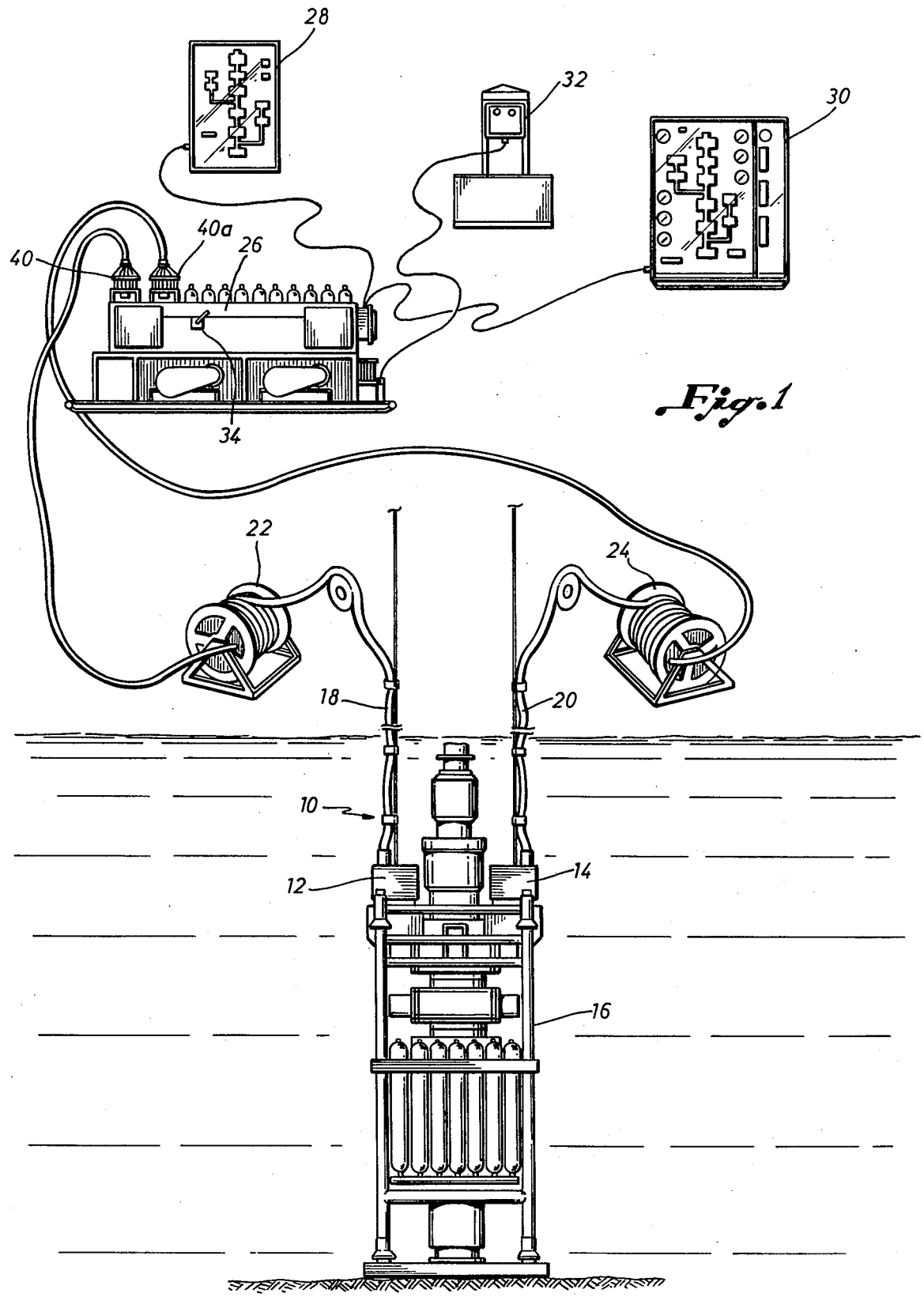
FIG. 1 is an elevational view illustrating the use of the present invention in a hydraulic subsea control system.

Referring now to FIG. 1, the reference numeral 10 generally indicates a hydraulic subsea blowout preventer control system having two separate subsea control pods 12 and 14 mounted on a conventional blowout preventer stack 16 for controlling the operation of various types of blowout preventers. Each of the pods 12 and 14 is conventional such as disclosed in U.S. Pat. No. 3,701,549 and generally includes control valves which are actuated from fluid control lines for controlling hydraulic power from a power supply line for actuating underwater equipment. The pods 12 and 14 are redundant and only one of the pods is used at a time. Separate hoses 18 and 20 are connected to the pods 12 and 14, respectively, and are generally reeled off of a reel 22 and 24, respectively, and are connected to conventional surface controls. The hoses 18 and 20 generally consist of a single hydraulic power supply line and a set of smaller fluid control lines which extend between the pods and the surface controls.

The surface controls are conventional and consist of a hydraulic control manifold and accumulator unit 26 one or more operator control panels 28 and 30, an emergency power pack 32 and a pod selector four-way hydraulic valve 34.

In the pod selector four-way valve 34 one position supplies full hydraulic fluid power to the power supply line of one of the hoses 18 or 20 while venting the pressure off of the fluid power supply line in the other hose whereby only one of the pods 12 or 14 is provided with a hydraulic fluid power supply. However, in conventional practice when the driller choses to operate a function through the control panels 28 or 30, he applies redundant control pressure through corresponding control lines in both of the hoses 18 and 20. Of course, since only one of the fluid supply lines to either the hose 18 or 20 is pressurized, only one of the pods 12 and 14 is performing work. By having the same control line in both pods 12 and 14, pressurized or vented simultaneously, the transition between one of the pods to the other will occur smoothly when the four-way valve 34 is actuated since the selected control lines have already been actuated.

However, the disadvantage is that if one of the control lines in either of the hoses 18 and 20 ruptures or one of the control lines in either of the pods 12 or 14 fails, the failure will vent pressure off of the corresponding control line in the second pod. Therefore, a failure in one hose or one pod would prevent operation of the second pod. Therefore, such a failure will effectively negate redundancy of control of the failed function.

The above description of a hydraulic subsea control system is conventional. The present invention is directed to a means of alternately connecting and disconnecting the sets of fluid control lines to each pod from the surface controls thereby isolating the inactive pod and its connected control lines from the active pod. Thus, the present invention provides a quick connect and disconnect fitting 40 and 40a between the surface controls and the hoses 18 and 20, respectively. The fittings 40 and 40a are identical.

Figure 2:
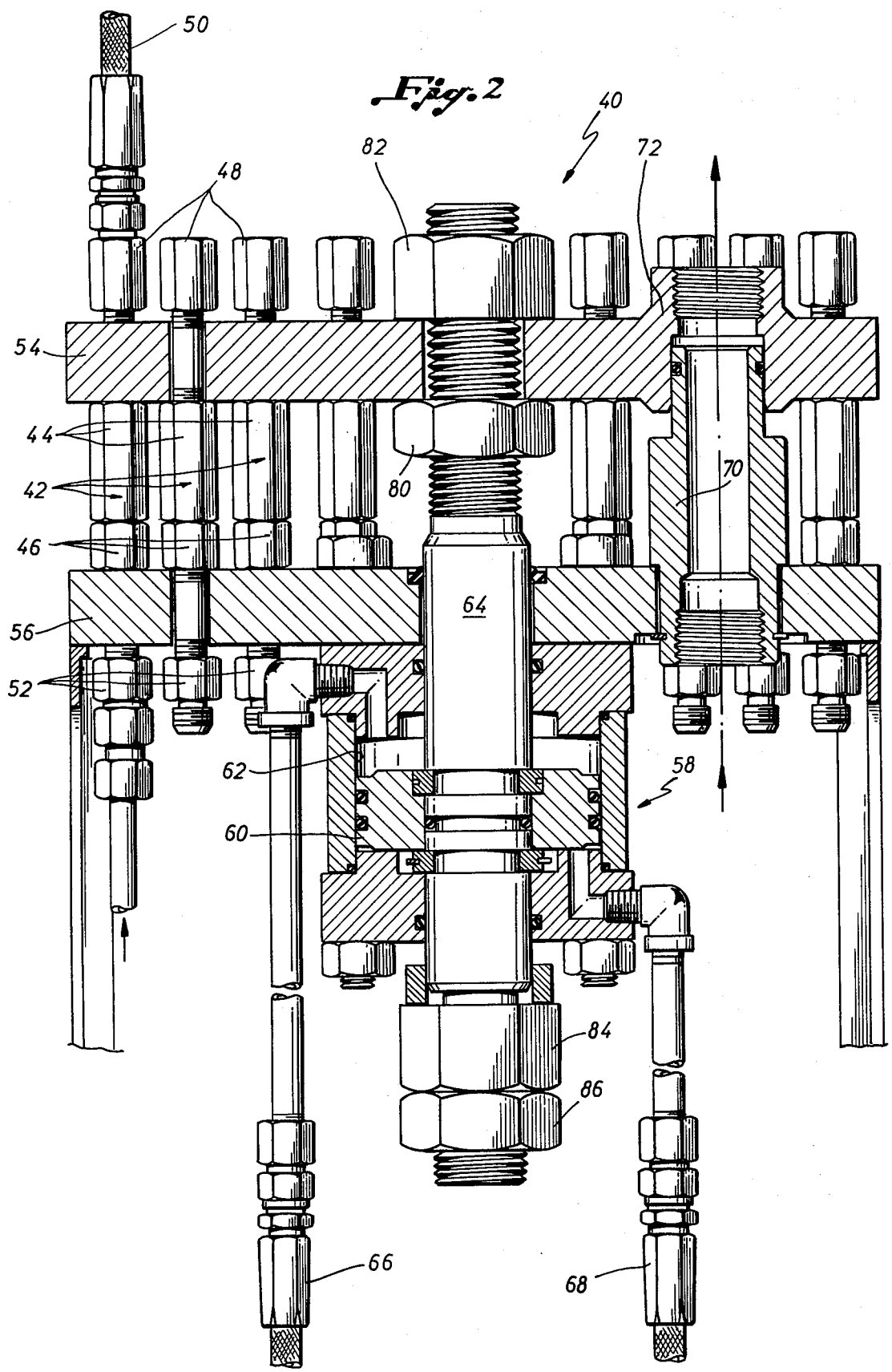
FIG. 2 is an enlarged elevational view, in cross section, of one of the control system disconnect assemblies in the connect position.
Figure 3:
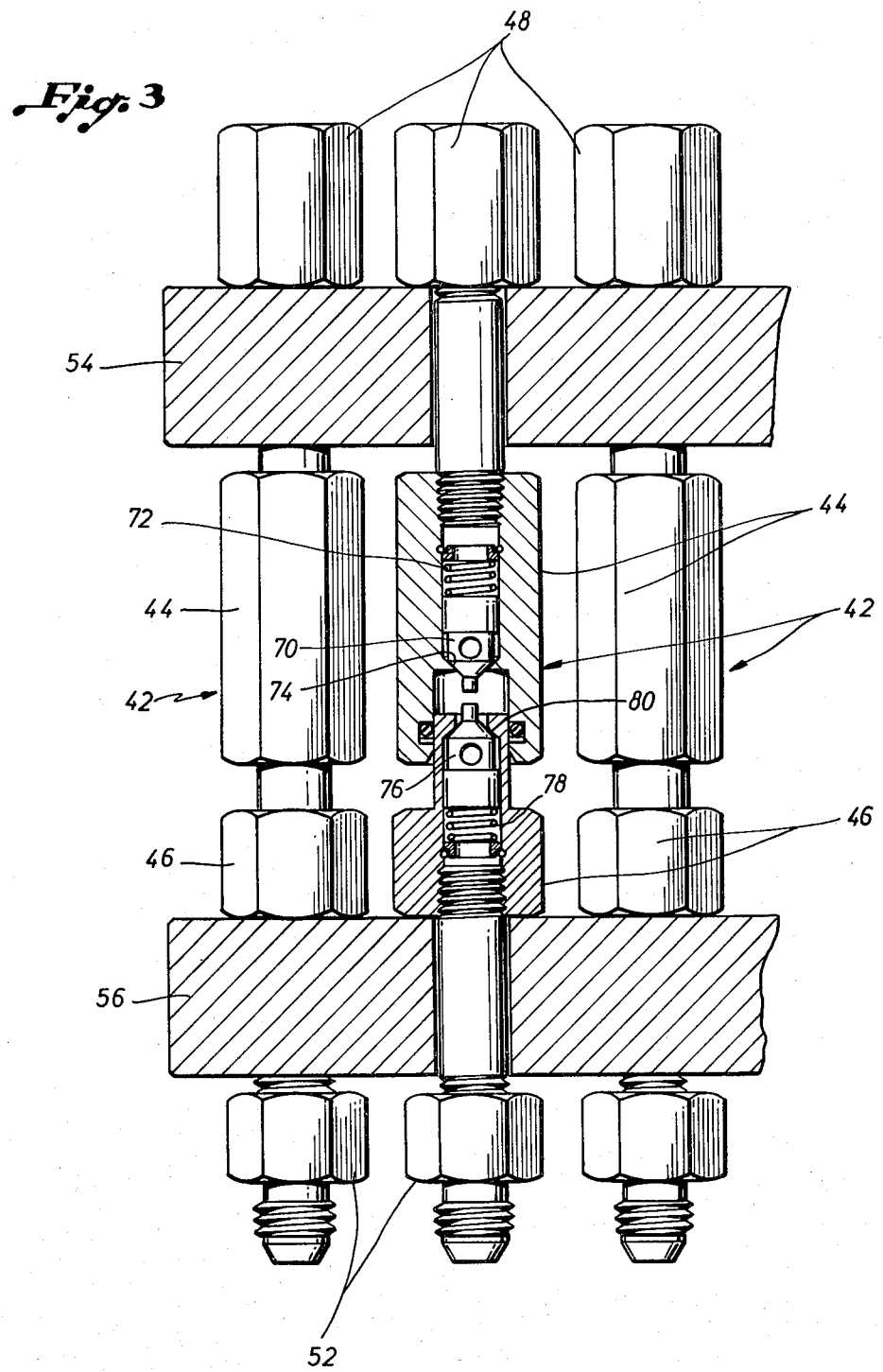
FIG. 3 is a further enlarged, fragmentary, cross-sectional view of a portion of one of the control system disconnect systems with the control system in the disconnect position.

Referring now to FIGS. 2 and 3, only the disconnect fitting 40 is shown as the fittings 40 and 40a are identical. The quick connect and disconnect fitting 40 includes a plurality of coacting quick disconnect couplings 42 having first portions 44 and second portions 46 which are positioned between the surface controls and each set of fluid control lines to the separate pods 12 and 14. Thus, the first portions 44 are connected to fittings 48 which are individually connected to fluid control lines 50 which are enclosed within the hose 18. The second portions 46 are connected to fittings 52 which are connected to the surface controls for receiving control fluid therethrough. A first junction plate 54 is provided connected to the first portions 44 and a second junction plate 56 is provided connected to the second portions 46. The junction plates 54 and 56 are movable relative to each other by any suitable means such as a hydraulic piston and cylinder assembly 58 in which a piston 60 is movable within the cylinder 62. The cylinder 62 is connected to one of the plates such as 56 and the piston rod 64 is connected to the other plate such as 54 whereby actuation of the double acting piston 60 moves the junction plates 54 and 56 toward and away from each other for carrying the coupling portions 44 and 46 away from and towards each other. Movement of the double acting piston 60 is accomplished by fluid lines 66 and 68 leading to the cylinder 62 on opposite sides of the piston 60.

While the power line may be connected directly from the surface controls to the hose 18, it is preferable for the fluid power line, since it is a portion of the hose 18, to also be connected through the fitting 40. Therefore, a telescoping joint consisting of a first member 70 and a second member 72, one of which is connected to the plate 54, and the other of which is connected to the plate 56, is provided for the connection of the fluid power line of the hose 18. It is noted that fluid communication through the telescoping joints 70 and 72 occurs at all times as movement of the plates 54 and 56 relative to each other does not affect the fluid flow through the telescoping joints 70 and 72.

Referring now to FIG. 3, the coacting disconnect couplings 44 are best seen in their retracted position. The couplings may be of any suitable type such as Series H sold by National Coupling Company. Each of the coupling portions 44 and 46 include a valve such as a spring loaded poppet valve. Thus portion 44 includes a poppet valve 70 urged by a spring 72 to a closed position against seat 74. Similarly, portion 46 includes a valve 76 urged by a spring 78 to a closed position on seat 80.

When the plates 54 and 56 are in an extended position, as best seen in FIG. 3, the valves 70 and 76 are seated shutting off fluid flow from a surface control to the control lines 50. However, when the piston and cylinder assembly 58, as best seen in FIG. 2, retracts the plates 54 and 56, the valve 70 and 76 contact each other and are moved away from their seats 74 and 80, respectively, thereby establishing communication from the surface controls to the individual fluid lines 50 through the couplings 42.

Referring now to FIG. 2, it is noted that the piston 60 is located out against the end of the cylinder 62 and the portions 44 and 46 of the couplings 42 are in the fully engaged position for opening the valves 70 and 76. The plate 54 which is connected to coupling portions 44 is adjusted relative to the piston rod 64 by nuts 80 and 82 to provide a make up condition of the telescoping couplings 42 without applying undue force. An adjustable nut or nuts 84 and 86 is provided on the lower end of piston rod 64 for spacing out the disconnect position of the portions 44 and 46 (FIG. 3) to provide sufficient travel to allow the valves 70 and 76 to reseat and close, but short enough travel to ensure that the portions 44 and 46 are held in alignment or engaged for subsequent reconnection. There may be provided a lost motion between each fitting 48 and coupling portion 44 at plate 54 so that each fitting is free to float for ease of making up multiple fittings. Similarly, lost motion may be provided between fittings 52 and coupling portions 46 at plate 56 for the same reasons. When the plates are separated in the inactive position, they separate sufficiently to allow valves 70 and 76 to reseat without completely separating the couplings 42 thereby leaving them engaged for subsequent make up when the plates are retracted into the active position.

Figure 4:
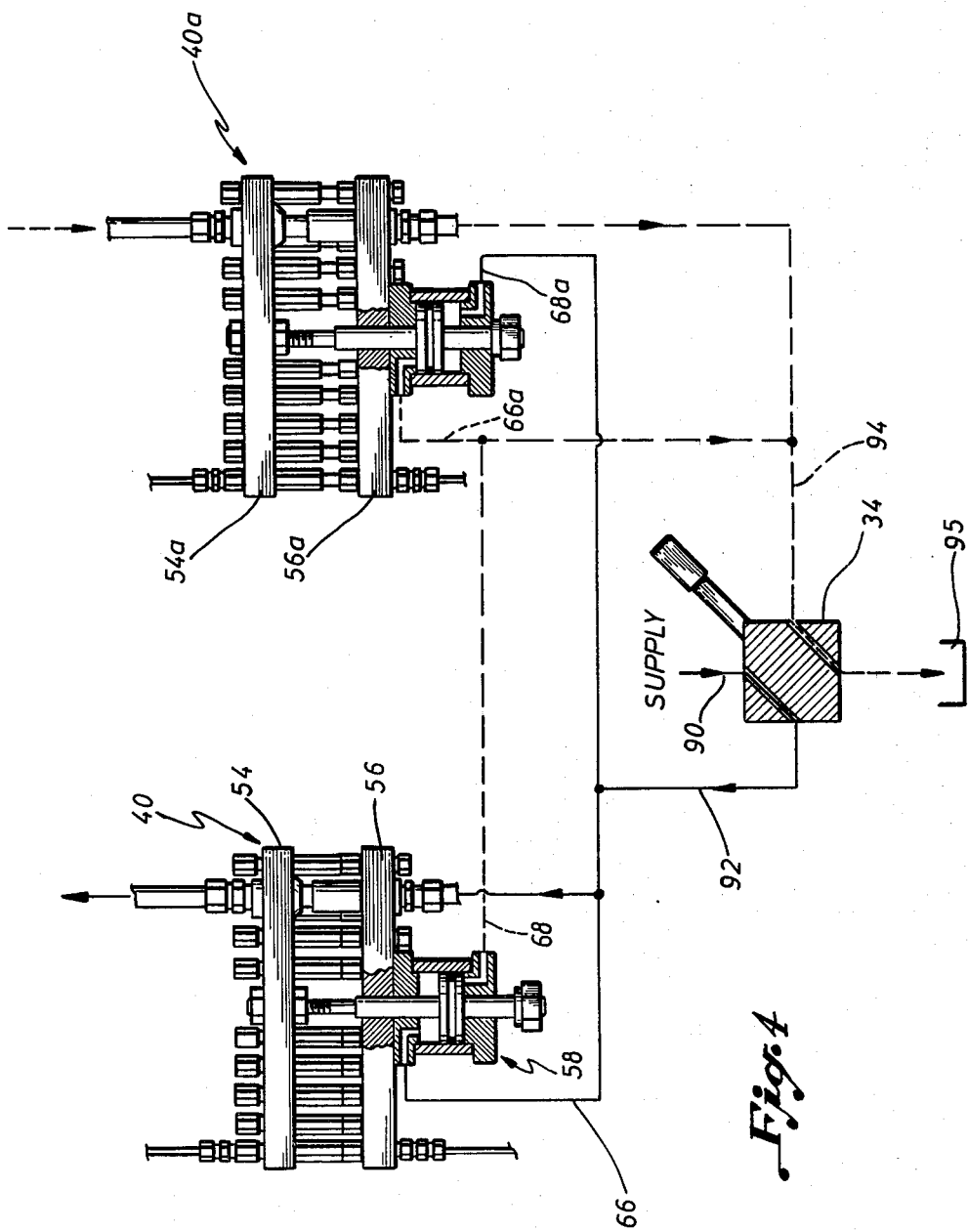
FIG. 4 is a schematic elevational view of the hydraulic controls for connecting and disconnecting the subsea control systems of the present invention.

Referring now to FIG. 4, the hydraulic connections of the quick connect and disconnect fitting 40 and 40a with the hydraulic valve 34 is best seen. With the hydraulic valve 34 in the position shown, fluid power from supply 90 flows into line 92 to the fluid power supply line of fitting 40 (members 70 and 72) as well as supplying power to line 66 to the piston and cylinder assembly 58 to retract plate 54 and fully engage couplings 42 thereby opening valves 70 and 76 whereby control fluid will flow through fitting 40 to line 18. At the same time fluid power in line 92 will flow to line 62a of fitting 40a causing plate 54a to move away from plate 56a thereby closing valves 70a and 76a and shutting off flow of control fluid through fitting 40a to line 20. In addition, fluid lines 68, 66a and the fluid power supply to line 20 is vented through valve 94 to the reservoir 95. With the valve 34 in the position shown, pod 12 is active and pod 14 is inactive. However, any failure in the control lines in line 20 or in the pod 14 will not interfere with the operation of pod 12.

When the valve 34 is reversed, fluid power from 90 is supplied to line 94 which provides fluid power to the fitting 40a and line 20 and activates piston and cylinder 58a to retract plate 54a to fully engage couplings 42a. At the same time valve 34 will vent power fluid from fitting 40 and line 18 and will extend plate 54 to disengage couplings 42.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts, and steps of the method, will readily suggest themselves to those skilled in the art and which are encompassed within the spirit of the invention and the scope of the appended claims.

What is claimed is:

1. In a hydraulic subsea control system having two separate redundant subsea control pods, a hose connected to each pod, each hose including a fluid power supply line and a set of fluid control lines, said hose extending between surface controls and each pod for selectively actuating said control lines for controlling hydraulic power from the power supply line to underwater equipment, and a hydraulic switch for alternately providing fluid power to the power supply lines, the improvement in means for alternately connecting and disconnecting the sets of fluid control lines to each pod from the surface controls comprising, coacting quick disconnect couplings having first and second portions and positioned between the surface controls and each set of fluid control lines to the separate pods, each portion including a valve whereby when the first and second portions are engaged the valves open to permit fluid flow and when disengaged the valves close to shut off said fluid flow through the control lines, first and second junction plates connected between the surface controls and each set of fluid control lines to the separate pods, the first plates connected to the coupling portions on each set of fluid control lines, and the second plates connected to the coupling portions connected to the surface controls, a hydraulic cylinder and piston assembly connected between each of the first and second plates, said assemblies connected to control means alternately connecting and disconnecting the set of fluid control lines to each pod to the surface controls whereby the two pods are controlled separately, but redundantly.

2. The apparatus of claim 1 wherein the hydraulic cylinder and piston assemblies are double acting and the control means is the hydraulic switch for alternately providing fluid power to the power supply lines whereby when power is supplied to the power line of one pod the coacting couplings to the one pod are connected while fluid power is turned off, and the coacting couplings of the other pod are disconnected.

3. The apparatus of claim 1 wherein a telescoping joint is connected between the first and second junction plates for connection to the fluid power supply line.

4. The apparatus of claim 1 wherein the first and second plates are connected to said coupling portions by lost motion connections.

5. The apparatus of claim 1 including adjustable stops for controlling the extent of movement of said plates both toward and away from each other.

6. The apparatus of claim 5 wherein the first and second coupling portions are telescopically engagable and said adjustable stops prevent the disengagement of the first and second portions.

* * * * *